March 18, 1969    D. A. McKEE    3,434,053
CIRCUITS FOR AN ELECTRICAL RMS MEASURING INSTRUMENT
Filed July 21, 1964
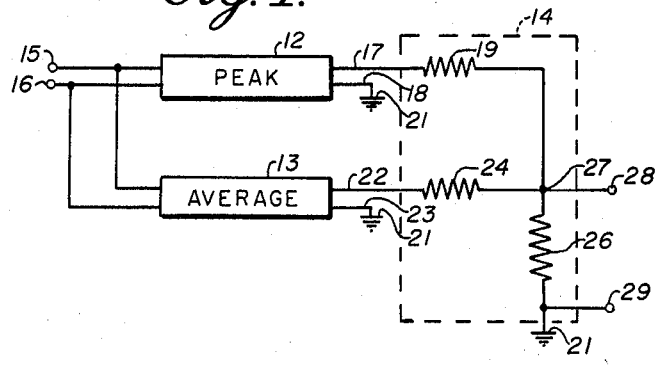
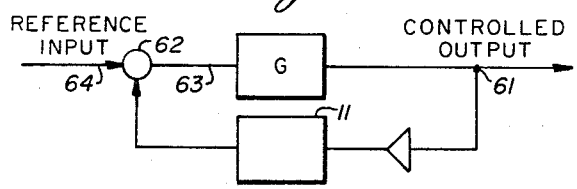
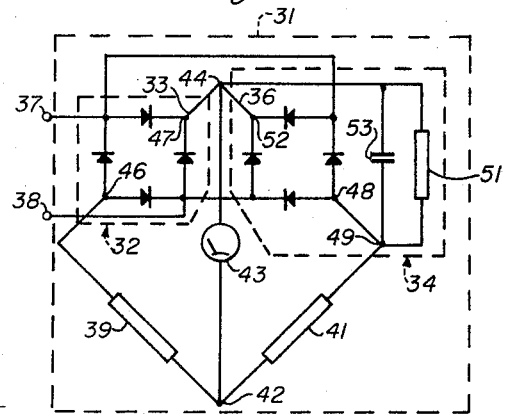
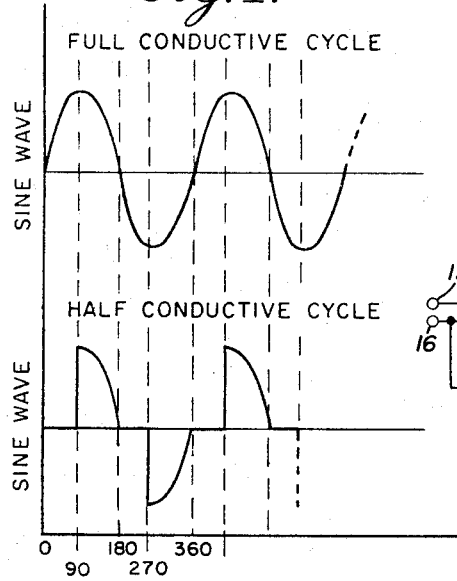
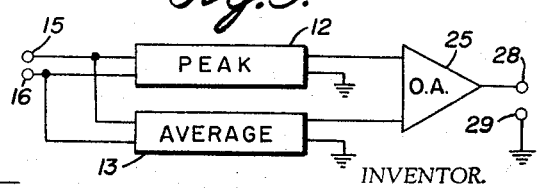
INVENTOR.
DONALD A. McKEE
BY
ATTORNEY

United States Patent Office 3,434,053
Patented Mar. 18, 1969

3,434,053
CIRCUITS FOR AN ELECTRICAL RMS
MEASURING INSTRUMENT
Donald A. McKee, Grand Junction, Colo., assignor to the United States of America as represented by the United States Atomic Energy Commission
Filed July 21, 1964, Ser. No. 384,268
U.S. Cl. 324—132                                  6 Claims
Int. Cl. G01r 15/10, 7/00

ABSTRACT OF THE DISCLOSURE

An RMS measuring instrument including a first circuit for measuring peak electrical values and a second circuit for measuring average electrical values, both terminated in a summing device. Impedances for adjusting the amplitude of the electrical values in each circuit establish an electrical signal in the summing device which approximates the RMS level of an incoming signal.

---

The present invention relates to a four terminal network which generates an output electrical signal proportional to the root mean square (RMS) value of a complex input electrical wave. More specifically, the invention relates to an electronic device in which electrical signals representative of the average and peak values of a complex periodic electrical wave are proportionately combined to produce an output electrical signal proportional to the RMS value of that complex periodic wave.

One significant application of the present invention is tis use as an RMS approximating or indicating voltmeter. As known in the art today there are three common types of RMS approximating voltmeters: square law instruments, peak reading instruments and average reading instruments. The square law instruments, such as the iron vane meter, the dynamometer, and the thermocouple meter, measure the average square value of current. With a properly calibrated meter scale, these square law instruments give an accurate indication of the RMS voltage of a complex electrical wave. While useful within limits, these square law instruments have certain deficiencies. The iron vane meter and the dynamometer have a limited useful upper frequency limit of approximately 2500 cycles per second. The thermocouple meter, although accurate over a very wide range of frequencies, because of its thermal lag, has an inherently slow response to voltage changes and furthermore is sensitive to environmental changes.

Peak reading instruments, such as the diode-meter combination, can be calibrated to convert the peak value of a sine wave to an RMS indication. These instruments accurately measure the RMS value of a sine wave. However, the presence of harmonics in the applied electrical wave radically degrades the instrument accuracy. For example, the presence of 20% second harmonic with no change in effective value can change the instrument reading by as much as 20%, whereas in the present invention, such a harmonic may only change the reading a few percent. Also, harmonic phase shifts cause considerable error in these peak reading instruments.

The average reading instruments, such as a VTVM, are calibrated to convert the average value of the wave to an arbitrary RMS indication. These instruments rectify, or amplify and then rectify, the measured electrical wave and the resulting direct current operates a d'Arsonval type of instrument to give a reading proportional to the average amplitude of the measured electrical wave. These average reading instruments, though not as sensitive as the peak reading instruments, are susceptible to waveform errors which depend upon the phase as well as the magnitude of the harmonics present.

It is significant that apart from the thermally responsive devices such as a thermocouple, the present state of the art does not include a four terminal network indicating circuit whose output voltage is truly proportional to its input voltage regardless of harmonic phase or amplitude. The present invention, however, provides such a network which overcomes disadvantages inherent in previous devices and provides an accurate indication of true RMS values of a complex electrical waveform.

Accordingly, it is an object of the present invention to provide a four-terminal network whose output voltage is proportional to the input voltage independent of harmonic amplitude and phase.

A further object of the present invention is to provide a network which first generates electrical signals proportional, respectively, to the peak and to the average value of the input electrical wave and then proportionately unites these peak and average signals to give an output voltage closely proportional to the RMS value of said input voltage.

Still another object of the present invention is to provide a new and improved RMS approximating network which has a wide frequency range, a fast response, and is relatively insensitive to temperature changes.

A still further object of this invention is to provide an RMS approximating electrical meter which is insensitive to harmonic phase and amplitude shifts.

Further objects and advantages of this invention will become apparent from the following description and from the accompanying drawings in which:

FIGURE 1 is a generalized schematic diagram of a network for determining RMS voltage values in accordance with the invention;

FIGURE 2 schematically depicts a bridge type RMS approximating voltmeter;

FIGURE 3 shows the RMS approximating network of the present invention as used in a closed-loop control circuit;

FIGURE 4 graphically depicts full and half conduction cycle sine wave signals used to calibrate embodiments of FIGURES 1 and 2; and FIGURE 5 is a variation of the output portion of the schematic of FIGURE 1.

The present invention as set forth in the following detailed description is founded on the definition that the RMS value of an electrical wave is a function of a ratio between its peak and average values and generally lies between the average and peak values.

Referring to FIGURE 1, a generalized RMS approximating network 11 is shown as a two channel device which includes a peak reading circuit 12, and an average-reading circuit 13, having the outputs thereof coupled to a summing device 14. Moreover, inputs of circuits 12 and 13 are connected in parallel to input terminals 15 and 16 to which the electrical signal to be measured is applied.

More specifically, summing circuit 14 includes resistors 19 and 24 having one end of each respectively connected to output terminals 17 and 22 of circuits 12 and 13, respectively, of which the other output terminals 18 and 23 are connected to a common ground 21. The remaining ends of resistors 19 and 24, and one end of another resistor 26 of circuit 14 are connected to a common point 27 which common point 27 in turn is coincident with a first output terminal 28 of network 11. A second output terminal 29 for circuit 11 is provided at the common junction of ground 21 and the remaining end of resistor 26. The nature of circuits 12 and 13 as well as the parameters for selecting relative values of the resistive components of summing circuit 14 as required for operation in accordance with the invention will be set forth more fully hereinafter.

In operation, when a complex periodic wave is applied to input terminals 15 and 16, of the peak reading circuit 12, a voltage appears across terminals 17 and 18 which is proportional to the peak voltage of the input wave. A second voltage appears across terminals 22 and 23, of average reading circuit 23, which is proportional to the average voltage of the input wave. Summing circuit 14 combines these peak and average voltages across resistor 26 in a particular manner determined by the relative resistance ratio of resistors 19 and 24. More specifically, with appropriate values for resistors 19 and 24 having been selected, the voltage appearing across resistor 26, and hence output terminals 28 and 29, will be proportional to the RMS value of the input voltage applied at terminals 15 and 16. Empirical parameters defining resistors 19, 24, and 26 may be determined as follows: First select a resistance value for resistor 24. Then iteratively adjust the resistance value of resistor 19 until the voltage appearing across resistor 26 doubles when a constant-peak-value periodic input electrical signal applied to input terminals 15 and 16 is changed from a half conduction cycle sine wave signal to a full conduction cycle sine wave signal. A periodic half conduction cycle sine wave of voltage is herein defined as a signal which duplicates a sine wave signal of the 90° to 180° and 270° to 360° portions but otherwise has zero amplitude. FIGURE 4 depicts both a half conduction cycle sine wave signal and a full conduction cycle sine wave.

It should be noted that as an alternative calibration method, the peak and the average voltages can be proportioned approximately as follows: Consider peak reading network 12 and resistor 19 as comprising a first signal channel. Then consider average reading network 13 and resistor 24 as comprising a second channel. Now iteratively adjust the ratio of the signal gain of these two channels such that the output signal doubles when a periodic constant peak voltage value input signal is changed from a half conduction cycle sine wave of voltage to a full conduction cycle sine wave of voltage.

In practice, resistor 26 can be a d'Arsonval galvanometer with an appropriate series resistor serving as a voltmeter. Also, summing network 14 can be replaced with an operational amplifier or other equivalent summing device. Such an arrangement is shown in FIGURE 5. An operational amplifier 25 of the signal adding type sums the output of the average reading circuit 13 and the peak reading circuit 12.

FIGURE 2, depicts a bridge-type RMS approximating voltmeter 31, which is a particular case of the network shown in FIGURE 1. The aforesaid average reading circuit is comprised of an unfiltered full-wave bridge rectifier unit 32 connected as one arm 33 of the bridge RMS approximator. This rectifier unit 32 is responsive to an AC waveform to provide an average current representation of the AC waveform. The peak reading circuit, supra, is provided as a second full-wave bridge rectifier unit 34 having a filtered output connected to a second arm 36 of the bridge RMS approximator, and is responsive to the input AC waveform to provide a peak current representation of the AC waveform. The inputs to each full-wave bridge rectifier unit 32 and 34 are connected in parallel relationship to input terminals 37 and 38. The positive output terminal 46 of full-wave bridge rectifier unit 32 is connected to a first end of a selected load resistor 39. The positive output terminal 48 of full-wave bridge rectifier unit 34 is connected to a first end of a selected load resistor 41. The negative output terminals 47 and 52, respectively of rectifier units 32 and 34, are connected to common terminal 44. The second ends of resistors 39 and 41 are connected to a common terminal 42. Current-sensitive meter 43 is connected between terminal 42 and common terminal 44 to complete the formation of the bridge RMS approximating instrument.

In operation, the complex periodic wave to be measured is delivered to input terminals 37 and 38 and, consequently, to each of the full-wave bridge rectifier units 32 and 34. The operation of the unfiltered full-wave bridge rectifier unit 32 results in the generation of an average current representation of the input AC waveform which flows from output terminal 46 of full-wave bridge rectifier unit 32, through load resistor 39, through current-sensitive meter 43, and to terminal 47 of full-wave bridge rectifier unit 32. At the same time, the operation of the filtered full-wave bridge rectifier unit 34 results in the generation of peak current representation of the input AC waveform. The output current from full-wave bridge rectifier unit 34 flows from output terminal 48 and divides at junction 49 of the current divider formed by the load resistor 41 and a selected bleeder resistor 51. The resulting current through load resistor 41 flows through current-sensitive meter 43 to terminal 52 of the full-wave bridge rectifier unit 34. By selecting the impedance values of resistors 39 and 41, the summation of the average and peak current representation of the AC waveform will result in current-sensitive meter 43 indicating the approximate RMS value of the AC waveform independently of the harmonic content of the waveform. As stated above in conjunction with FIGURE 1, these values can be defined by an iterative calibration process. That is, first select resistor 41. For the utmost accuracy of measurement it has been found that resistor 41 should have a value of at least one order of magnitude greater than the resistance of meter 43. Then by a series of successively better approximations, adjust the resistance of resistor 39 such that with a full conduction cycle sine wave of voltage applied to input terminals 37 and 38, the reading of meter 43 is double the reading which occurs when a half cycle conduction sine wave voltage of the same peak value is applied to terminals 37 and 38. In practice the following values have been satisfactorily used:

| | | |
|---|---|---|
| Resistor 51 | ohms | 5000 |
| Resistor 41 | do | 132K |
| Resistor 39 | do | 21.5K |
| Capacitor 53 | microfarads | 10 |
| Resistance of meter 43 | ohms | 3600 |

As a check on the accuracy of the RMS meter of FIGURE 2, the output voltage wave of a thyratron circuit having a variable phase angle of conduction was fed to the meter. For various phase angles, the true RMS voltage was calculated and compared with the meter reading. The errors observed for the various phase angles of conduction are tabulated below:

| Phase angle of conduction (Degrees): | Percent error |
|---|---|
| 20 | 5 |
| 40 | 2 |
| 60 | 0 |
| 120 | ½ |
| 180 | 5 |

FIGURE 3 shows the present invention as used in a feedback power control system. Here, the RMS approximating or determining circuit 11 feeds a voltage proportional to the RMS of controlled output 61 to summing point 62. By properly observing signal polarities, an error signal is obtained at point 63 which is the difference between reference input 64 and the RMS value of controlled output 61. This block diagram is merely illustrative of the many control system applications, especially power control, made possible with the transfer function of the present invention.

The invention should be construed liberally, and it will be understood that various changes and modifications may be made without departing from the spirit and scope of the invention. For example, the summing network of FIGURE 1, could be an integral part of the peak reading and average reading networks. As another example, resistors 19 and 24 shown in FIGURE 1 could have identical impedance values and a variable gain amplifier placed in series with one of these resistors would appropriately proportion the summing of the peak and average signals.

What is claimed is:

1. A network for determining RMS values comprising:
   (a) a first electrical-wave peak-reading circuit,
   (b) a second electrical-wave average-reading circuit, said first and second circuits having electrically parallel input terminals for receiving a periodic input electrical signal,
   (c) a summing device having at least a first and a second input channel, said first channel disposed to receive a signal from said first circuit, said second channel disposed to simultaneously receive a signal from said second circuit, the composite gain of the combination of said first channel in conjunction with said first circuit being of a value with respect to the composite gain of the combination of said second channel in conjunction with said second circuit such that the output signal of said summing device is doubled as said periodic input electrical signal having a constant peak value is changed from a half conduction cycle sine wave to a full conduction cycle sine wave, and
   (d) terminal means to connect the output of said summing device to a load.

2. An instrument for determining RMS values as recited in claim 1 wherein said summing device is comprised of:
   (a) a first resistor electrically shunting said terminal means,
   (b) a second resistor electrically serially connected between said second circuit and a first end of said first resistor, said first resistor impedance value being at least one order of magnitude greater than said first resistor impedance value,
   (c) a third resistor electrically serially connected between said first circuit and said first resistor first end, said third resistor being of a value at which the summing device output voltage is doubled when said periodic input signal having a constant peak value is changed from a half conduction cycle sine wave to a full conduction cycle sine wave.

3. An instrument for determining RMS values as recited in claim 1 further defined by said summing device being an operational amplifier electrically disposed to receive electrical signals from said first and second circuits and to feed an electrical signal to said load.

4. An instrument for analyzing volt-current characteristics of electrical signals comprising:

(a) first rectifier means responsive to said electrical signals by generating an electrical signal proportional to the average value of said electrical signal,
   (b) second rectifier means simultaneously responsive to said electrical signals by generating an electrical signal proportional to the peak value of said electrical signal, the input of said second rectifier means electrically connected in parallel relationship to the input of said first rectifier means,
   (c) said first and second rectifier means each having at least first and second output terminals,
   (d) current measuring means having a first and second terminal, said first terminal electrically connected to the second output terminals of said first and second rectifier means,
   (e) a first resistor, electrically connected between said first rectifier means first output terminal and the second terminal of said current measuring means, said first resistor having an impedance value at least one order of magnitude greater than the impedance value of said current measuring means,
   (f) a second resistor electrically connected between said second rectifier means first output terminal and said current sensing means second terminal, said second resistor being of a value at which the indication of the current sensing means doubles when a constant peak value periodic electrical signal applied to the parallel inputs of both rectifier means is changed from a half conduction cycle sine wave to a full conduction cycle sine wave.

5. An instrument as recited in claim 4 further defined by said second rectifier means being a full-wave bridge rectifier having a filtered output, and said first rectifier means being an unfiltered full-wave bridge rectifier.

6. An instrument as recited in claim 4 wherein said first resistor has a resistance value of 21,500 ohms, said second resistor has a resistance value of 132,000 ohms and said current measuring means has a resistance value of 3600 ohms.

References Cited

UNITED STATES PATENTS

| | | | |
|---|---|---|---|
| 1,895,812 | 1/1933 | Morecroft | 324—119 XR |
| 2,871,447 | 1/1959 | Hall | 324—132 XR |
| 2,887,576 | 5/1959 | Harmuth | 324—132 XR |
| 3,064,192 | 11/1962 | Schwarzlander | 324—120 XR |

RUDOLPH V. ROLINEC, *Primary Examiner.*

E. F. KARLSEN, *Assistant Examiner.*

U.S. Cl. X.R.

324—140; 328—144